(12) United States Patent
Paske

(10) Patent No.: US 12,012,714 B2
(45) Date of Patent: Jun. 18, 2024

(54) VIBRATION ISOLATORS AND TAMPERS

(71) Applicant: M-B-W, Inc., Slinger, WI (US)

(72) Inventor: Benjamin J. Paske, Slinger, WI (US)

(73) Assignee: M-B-W, Inc., Slinger, WI (US)

(*) Notice: Subject to any disclaimer, the term of this patent is extended or adjusted under 35 U.S.C. 154(b) by 300 days.

(21) Appl. No.: 16/904,767

(22) Filed: Jun. 18, 2020

(65) Prior Publication Data

US 2020/0318307 A1    Oct. 8, 2020

Related U.S. Application Data

(62) Division of application No. 15/869,923, filed on Jan. 12, 2018, now Pat. No. 10,781,566, which is a division of application No. 14/715,162, filed on May 18, 2015, now abandoned.

(51) Int. Cl.
*E02D 3/046* (2006.01)
*F16F 3/04* (2006.01)

(52) U.S. Cl.
CPC .............. *E02D 3/046* (2013.01); *F16F 3/04* (2013.01)

(58) Field of Classification Search
CPC .................................. E02D 3/046; F16F 3/04
USPC ........... 173/93, 115, 128–129, 133, 137, 210
See application file for complete search history.

(56) References Cited

U.S. PATENT DOCUMENTS

| 665,391 A * | 1/1901 | Chapman | F16F 7/108 |
| | | | 267/137 |
| 1,102,652 A | 7/1914 | Gibb et al. | |
| 2,748,750 A * | 6/1956 | Altschuler | E02D 3/068 |
| | | | 267/128 |
| 2,768,646 A * | 10/1956 | Plank | F16K 31/126 |
| | | | 200/83 R |
| 2,875,731 A | 3/1959 | Settles et al. | |
| 3,286,790 A * | 11/1966 | Kestel | B25D 17/26 |
| | | | 184/26 |
| 3,566,287 A | 2/1971 | Johnston | |
| 3,630,127 A * | 12/1971 | Yamato | E02D 3/068 |
| | | | 404/133.1 |
| 3,696,593 A | 10/1972 | Thorud et al. | |
| 3,722,960 A | 3/1973 | Von Lowis of Menar | |
| 3,779,135 A | 12/1973 | Sugimura | |
| 3,788,404 A * | 1/1974 | Koudelka | B25D 17/24 |
| | | | 173/211 |

(Continued)

FOREIGN PATENT DOCUMENTS

JP    2005058080 A    3/2005

OTHER PUBLICATIONS

Great Britain search report dated Nov. 22, 2017 in Great Britain Application No. GB1708217.3.

*Primary Examiner* — Robert F Long
(74) *Attorney, Agent, or Firm* — Andrus Intellectual Property Law, LLP

(57) ABSTRACT

A percussion action pneumatic tool for compacting backfill areas including a vibration isolator and a percussion mechanism. The vibration isolator includes an inner shaft and an outer sleeve attached to a pair of springs. The springs dampen vibration or feedback transferred from the percussion mechanism to the outer sleeve and felt by the operator. The percussion mechanism includes a pair of elbows and an air conduit which allows the airflow to move through a second flow path into a second air space when the valve assembly directs the airflow through the second flow path.

13 Claims, 5 Drawing Sheets

(56) References Cited

U.S. PATENT DOCUMENTS

| | | | | |
|---|---|---|---|---|
| 3,821,992 | A | 7/1974 | Matsuo | |
| 3,847,498 | A | 11/1974 | Grane | |
| 3,939,923 | A * | 2/1976 | Aldag | B25D 17/24 173/162.1 |
| 4,055,281 | A | 10/1977 | Rosen | |
| 4,071,094 | A | 1/1978 | Kilin et al. | |
| 4,083,290 | A | 4/1978 | Andres | |
| 4,104,001 | A * | 8/1978 | Uebel | E02D 3/068 404/133.1 |
| 4,170,427 | A * | 10/1979 | Grane | E02D 3/068 404/133.1 |
| 4,175,473 | A | 11/1979 | Iizumi | |
| 4,200,978 | A | 5/1980 | Irelan et al. | |
| 4,223,808 | A | 9/1980 | Williams | |
| 4,290,489 | A | 9/1981 | Leavell | |
| 4,303,002 | A * | 12/1981 | Maslakov | B25D 17/06 91/325 |
| 4,311,185 | A | 1/1982 | Zimmerman | |
| 4,402,369 | A | 9/1983 | Nikitin et al. | |
| 4,409,886 | A | 10/1983 | Herner | |
| 4,446,930 | A | 5/1984 | Nilsson et al. | |
| 4,477,343 | A | 10/1984 | Tucker | |
| 4,483,402 | A | 11/1984 | Vonhoff, Jr. | |
| 4,579,040 | A | 4/1986 | Masuda | |
| 4,913,331 | A | 4/1990 | Utsumi | |
| 4,938,297 | A * | 7/1990 | Schmidt | E21B 4/145 173/133 |
| 5,092,362 | A | 3/1992 | Yie | |
| 5,119,667 | A | 6/1992 | Hollis et al. | |
| 5,392,865 | A | 2/1995 | Piras | |
| 5,445,227 | A | 8/1995 | Heppner | |
| 5,620,027 | A | 4/1997 | Sato | |
| 5,645,370 | A | 7/1997 | Zurbes et al. | |
| 5,839,517 | A * | 11/1998 | Gwinn | B25D 17/043 173/211 |
| 5,934,162 | A | 8/1999 | Habermehl | |
| 6,095,256 | A | 8/2000 | Lindsay | |
| 6,102,022 | A | 8/2000 | Schave | |
| 6,250,977 | B1 | 6/2001 | Ness | |
| 6,293,729 | B1 | 9/2001 | Greppmair | |
| 6,302,622 | B1 * | 10/2001 | Nagasawa | E01C 19/35 404/133.05 |
| 6,315,059 | B1 | 11/2001 | Geldean | |
| 6,435,767 | B1 | 8/2002 | Steffen | |
| 6,435,843 | B1 | 8/2002 | Hur | |
| 6,536,324 | B1 | 3/2003 | Boissiere | |
| 6,582,155 | B1 | 6/2003 | Bromberger et al. | |
| 6,619,125 | B2 | 9/2003 | Laugwitz | |
| 6,776,242 | B1 | 8/2004 | Cunningham | |
| 6,860,228 | B2 | 3/2005 | Maier | |
| 7,052,475 | B2 | 5/2006 | Kim | |
| 7,059,423 | B1 | 6/2006 | Hoggarth | |
| 7,293,684 | B1 | 11/2007 | Wen | |
| 7,540,336 | B2 | 6/2009 | Steffen | |
| 7,682,102 | B1 * | 3/2010 | Burke | E01C 19/35 404/133.05 |
| 7,717,548 | B2 | 5/2010 | Tatsumi et al. | |
| 7,921,934 | B2 * | 4/2011 | Aoki | B25D 17/24 173/90 |
| 8,636,088 | B2 | 1/2014 | Muuttonen et al. | |
| 8,640,787 | B2 * | 2/2014 | Rohrer | E02D 7/10 173/114 |
| 8,668,026 | B2 * | 3/2014 | Aoki | B25D 17/245 173/210 |
| 8,720,602 | B2 | 5/2014 | Saf | |
| 8,733,468 | B2 | 5/2014 | Teipel | |
| 9,271,620 | B2 | 3/2016 | Meredith et al. | |
| 9,347,709 | B2 | 5/2016 | Schanti | |
| 2001/0014291 | A1 | 8/2001 | Nishio | |
| 2001/0043007 | A1 | 11/2001 | Jang | |
| 2003/0167880 | A1 * | 9/2003 | Yamakawa | G04D 3/0066 81/6 |
| 2004/0022582 | A1 | 2/2004 | Sick | |
| 2006/0165488 | A1 | 7/2006 | Morris et al. | |
| 2006/0272837 | A1 | 12/2006 | Steffen | |
| 2007/0172364 | A1 | 7/2007 | McNichol | |
| 2007/0204887 | A1 | 9/2007 | Wood | |
| 2008/0247824 | A1 | 10/2008 | Steffen | |
| 2008/0289841 | A1 * | 11/2008 | Kang | B25D 17/005 173/48 |
| 2009/0321099 | A1 | 12/2009 | Birath | |
| 2010/0327039 | A1 | 12/2010 | Adams | |
| 2011/0155403 | A1 | 6/2011 | Rohrer | |
| 2011/0179757 | A1 | 7/2011 | Scott-Stanbridge et al. | |
| 2011/0220819 | A1 | 9/2011 | Wiedenmann | |
| 2011/0290850 | A1 | 12/2011 | Wu | |
| 2013/0004237 | A1 | 1/2013 | Krings et al. | |
| 2013/0118769 | A1 | 5/2013 | Lee | |
| 2013/0255985 | A1 | 10/2013 | Zakuskin | |
| 2013/0279980 | A1 | 10/2013 | Steffen | |
| 2013/0336809 | A1 | 12/2013 | Antoun | |
| 2014/0208575 | A1 | 7/2014 | Jagdale et al. | |
| 2014/0262400 | A1 | 9/2014 | Berger et al. | |
| 2014/0290971 | A1 | 10/2014 | Kaindlbauer | |
| 2015/0102084 | A1 | 4/2015 | Zhao | |
| 2016/0258250 | A1 | 9/2016 | Vick | |
| 2016/0297058 | A1 | 10/2016 | Lilja et al. | |
| 2018/0283561 | A1 | 10/2018 | Shu | |

* cited by examiner

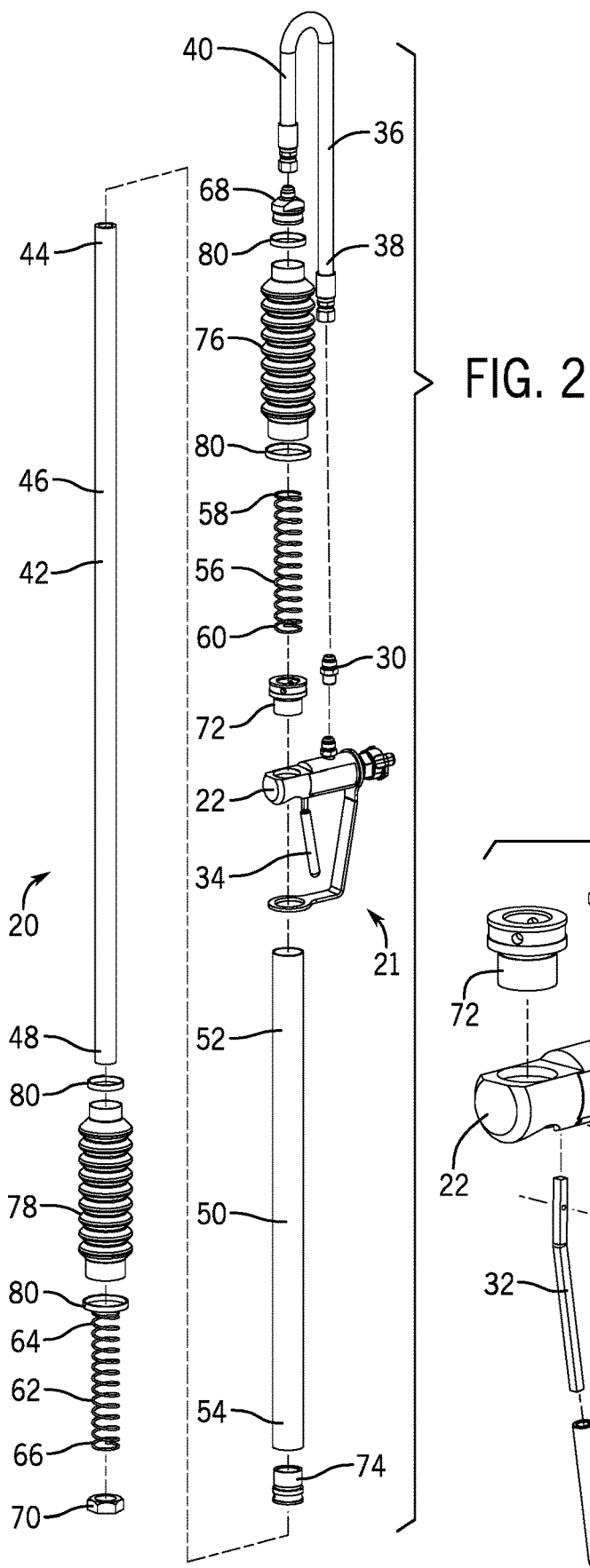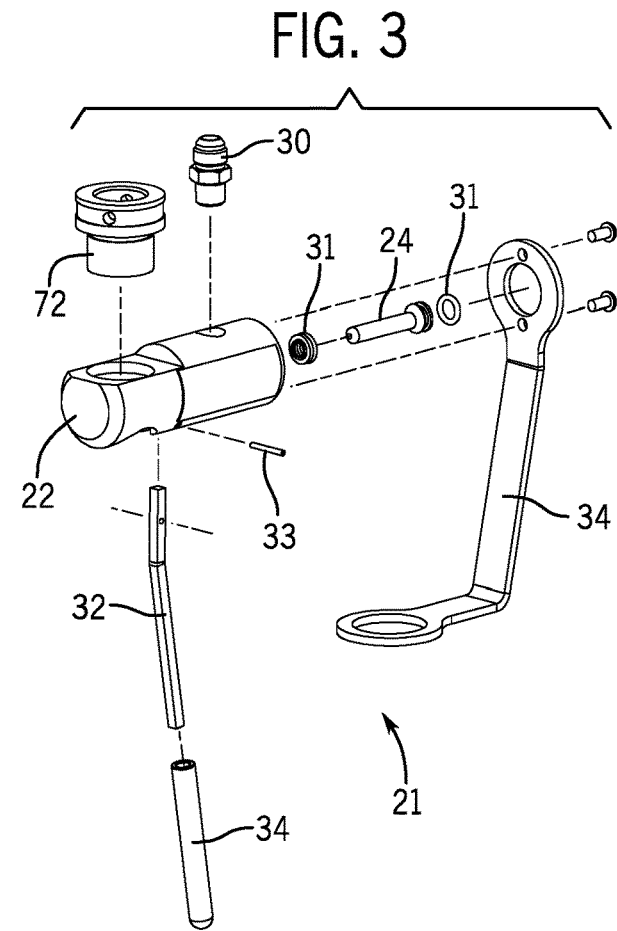

VIBRATION ISOLATORS AND TAMPERS

CROSS REFERENCE TO RELATED APPLICATIONS

This application is a divisional of U.S. patent application Ser. No. 15/869,923 filed on Jan. 12, 2018, published on May 17, 2018 as U.S. Patent Publication No. 2018/0135268; which application is a divisional of U.S. patent application Ser. No. 14/715,162, filed on May 18, 2015, published on Nov. 24, 2016, as U.S. Patent Publication No. 2016/0340849, which is now abandoned, the content of which is incorporated herein by reference in its entirety.

FIELD

The present disclosure relates to soil compaction using tampers, and more particularly to pneumatic pole or backfill tampers for compacting backfill.

BACKGROUND

The following U.S. patents are incorporated herein by reference in their entirety:

U.S. Pat. No. 7,540,336 discloses a vibration isolation assembly provided for use with a backfill tamper. In use, the vibration isolation assembly can be disposed between a handle and a percussion mechanism of the tamper and absorbs kickback forces from the percussion mechanism during backfill tamper operation. In one embodiment, the assembly includes an elongated conduit member that defines a passageway that allows compressed air to pass through the member to the percussion mechanism and a vibration dampening piston arrangement for absorbing feedback forces from the percussion mechanism during backfill tamper operation. The assembly may further include a spring arrangement for dampening vibration emanating from the piston.

U.S. Pat. No. 4,402,369 discloses a percussive-action pneumatic tool comprising a handle-carrying frame having successively accommodated therein a shock-absorber and a housing with the percussion mechanism therein, connected through a gas distribution system to a compressed air source. The frame has a length sufficient for abutting against the surface of a material being worked and has a guide which receives the housing with the percussion mechanism. The shock-absorber includes a receptacle mounted on the frame and communicating via a controllable valve alternatively with the compressed air source and the atmosphere, a rod being mounted in this receptacle, adapted to act upon the housing with the percussion mechanism, to move the housing relatively to the frame as compressed air is supplied into the receptacle.

Tampers are used by a wide range of entities including municipalities and utility companies to compact backfill areas. Often large compactors cannot access small backfill areas without disturbing the installed items, such as light poles, foundation walls, and the like. Tampers are often used in these applications because they are small, lightweight, and can compact backfill areas without damaging surrounding areas and/or items. Pneumatic tampers are especially useful as many mobile vehicles are equipped with air compressors which can be used with the pneumatic tampers and a variety of other hand-operated tools.

Tampers are also known to be operated for long periods of time as the operator compacts the backfill area. Accordingly, a relatively large amount of vibration or feedback is felt by the operator. The vibration or feedback can cause fatigue and/or serious injury to the operator if the vibrations or feedback from the tamper are experienced for prolonged periods of time. A tamper without any means of dampening vibrations can cause the operator to experience an amount of vibrations in excess of the recommended vibration limits established by experts in the field. Surpassing these recommended vibration limits can lead to permanent disabilities, such as White finger, carpal tunnel, arthritis and other ailments or injuries.

SUMMARY

This summary is provided to introduce a selection of concepts that are further described herein below in the detailed description. This summary is not intended to identify key or essential features of the claimed subject matter, nor is it intended to be used as an aid in limiting the scope of the claimed subject matter.

In one example, a vibration isolator apparatus for use with a percussion mechanism includes an inner shaft and an outer sleeve. The outer sleeve is slidably received around the inner shaft. A first spring and a second spring, each having a first end and second end respectively, are also included. The first spring is connected to the upper end of the outer sleeve and the second spring is connected to the lower end of the outer sleeve. When the inner shaft is connected to the percussion mechanism, the first spring and the second spring limit the vibration transferred to the outer sleeve from the percussion mechanism.

In another example, the pneumatic percussion mechanism includes a percussion shaft. The percussion shaft has a first end and second end and receives an airflow. A compaction assembly is also included. The assembly includes a ram head and a compaction rod, and the assembly is slidingly received in the percussion shaft. The assembly defines a first air space and a second air space within the percussion shaft. Also included are a valve assembly, a first elbow, a second elbow, and an air conduit. The air conduit connects to the first elbow and the second elbow. The first elbow is further connected to the valve assembly, and the second elbow is further connected to the percussion shaft. The valve assembly alternates the direction of the airflow from a first flow path to a second flow path. The first flow path is connected to the first air space and the second flow path is connected to the second air space. The second flow path is defined by the first elbow, air conduit, and second elbow. When the airflow moves through the first flow path, the first air space expands, the second air space shrinks, and the ram head moves downward in the percussion shaft. When the airflow moves through the second flow path, the second air space expands, the first air space shrinks, and the ram head moves upward in the percussion shaft.

Various other features, objects and advantages of the invention will be made apparent from the following description taken together with the drawings.

BRIEF DESCRIPTION OF THE DRAWINGS

Examples of the vibration isolator are described herein below with reference to the following drawing Figures. The same numbers are used throughout the Figures to reference like features and components.

FIG. 2 is an exploded view of a vibration isolator.
FIG. 3 is an exploded view of an actuator handle.

DETAILED DESCRIPTION OF THE DRAWINGS

Figure 1:
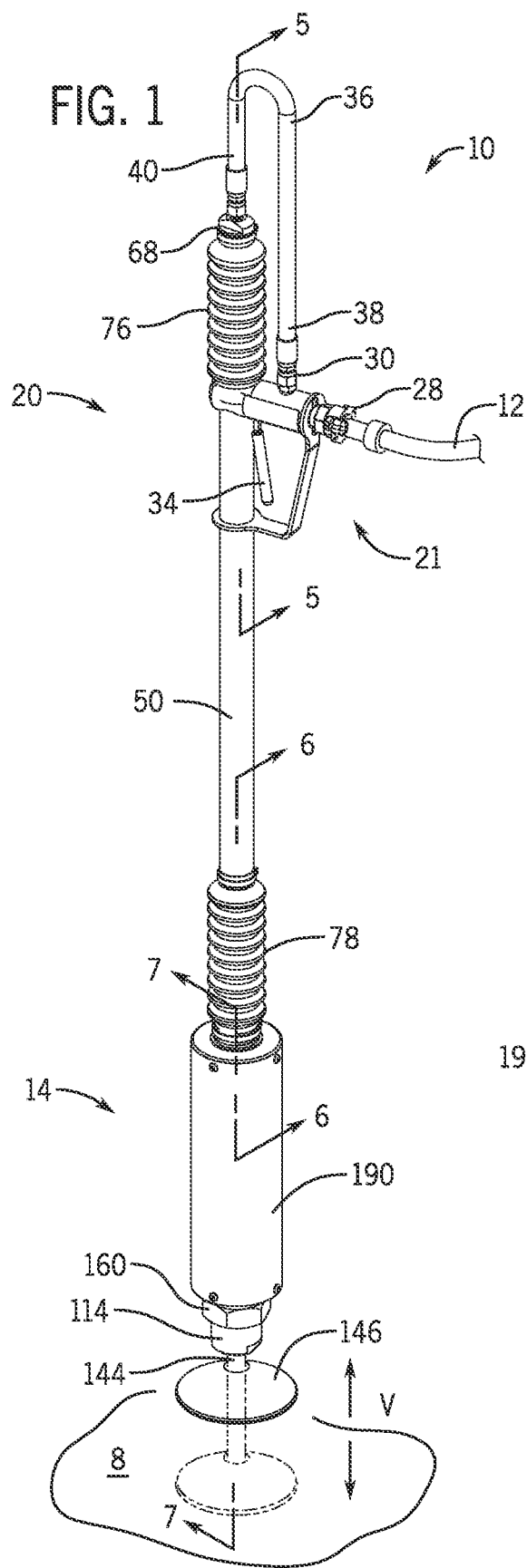
FIG. 1 is an isometric view of a pneumatic tamper.
Figure 6:
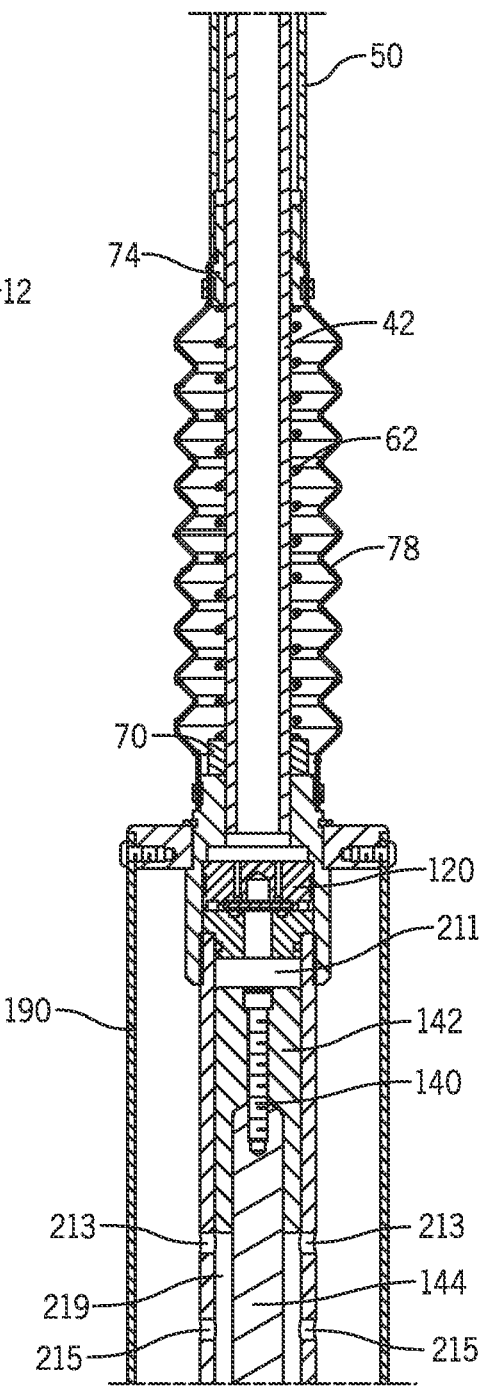
FIG. 6 is a cross sectional view along 6-6.

In the present description, certain terms have been used for brevity, clearness, and understanding. No unnecessary limitations are to be implied here from beyond the requirements of the prior art because such terms are used for descriptive purposes only and are intended to be broadly construed. The different systems and methods described herein may be used alone or in combination with other systems and methods. Various equivalents, alternatives, and modifications are possible within the scope of the amended claims.

FIGS. 1-7B depict the present disclosure of a pneumatic tamper 10. The tamper 10 includes a percussion mechanism 14, a vibration isolator 20, and an actuator handle 21. The actuator handle 21 is held by an operator and includes components that control the movement of airflow 41 through the tamper 10 from a pneumatic air source 12. The actuator handle 21 also includes adapters and/or connectors for connecting the air source 12 to the tamper 10, further described herein.

Figure 5A:
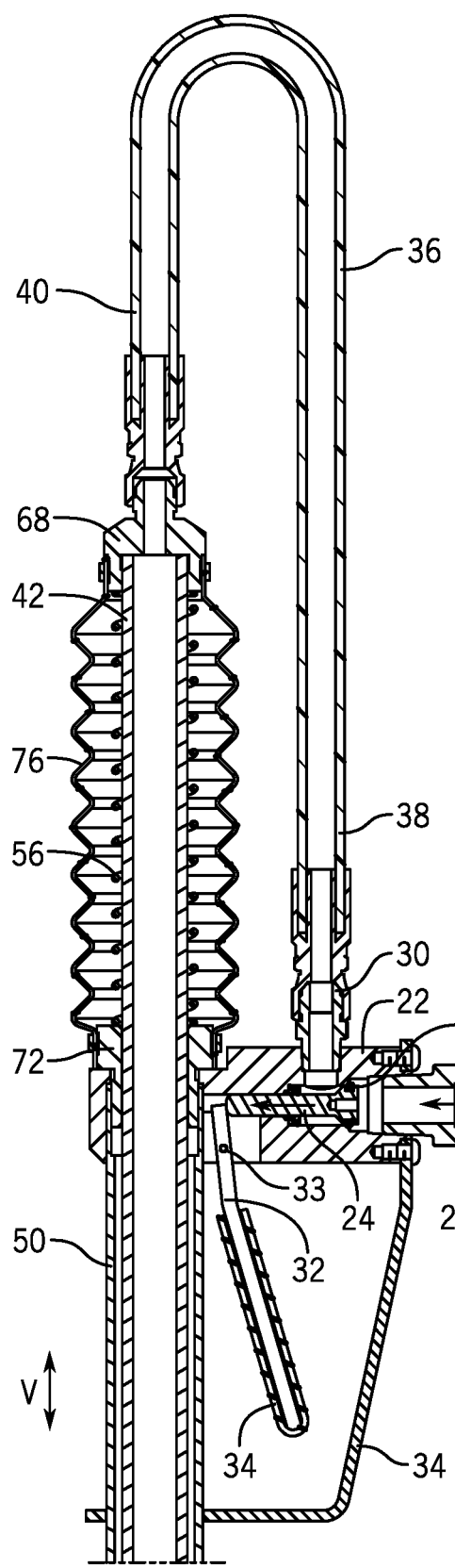
FIG. 5A is a cross sectional view along 5-5 when an actuator handle is connected to an air source.
Figure 5B:
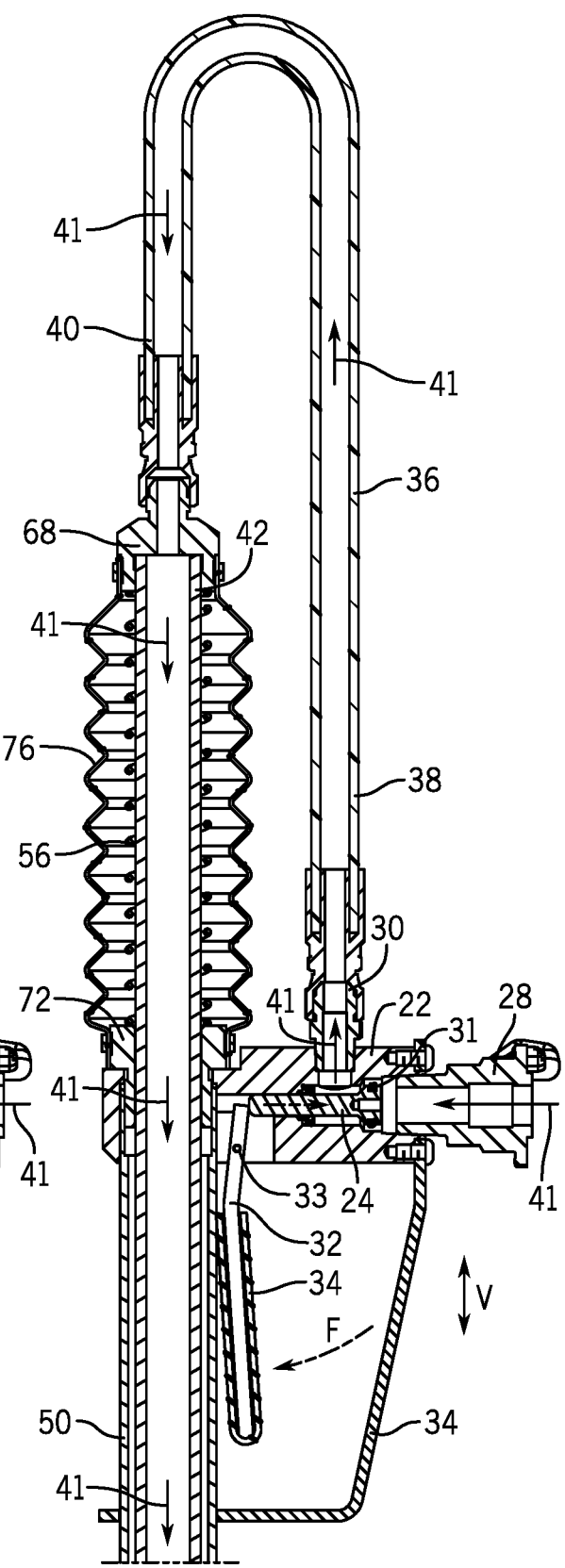
FIG. 5B is a cross sectional view along 5-5 when an actuator handle is connected to an air source and a force is acting on a trigger.

As depicted in FIGS. 3, 5A, and 5b, the actuator handle 21 includes a valve body 22, gaskets 31, a trigger 32, trigger guards 34, and an air hose 36. The air hose 36 includes a first end 38 and a second end 40. The trigger 32 is arranged to control airflow 41 from an air source 12. Gaskets 31 are included to create airtight and/or watertight seals between components. In a closed position, as depicted in FIGS. 5A, a spool 24 including a groove for a gasket 31 blocks the airflow 41 from moving through the valve body 22. When a force F is applied to the trigger 32, as depicted in FIG. 5B, the trigger 32 pivots about a pivot pin 33 into and moving the spool 24. The movement of the spool 24 pushes the gasket 31 away from the valve body 22 allowing the airflow 41 to move from the air compressor connector 28 into the valve body 22.

The valve body 22 directs the airflow 41 to a fitting 30 connected to the valve body 22, and the fitting 30 is connected to the first end 38 of the air hose 36. The airflow 41 moves through the air hose 36 to an upper cap 68 included with the vibration isolator 20.

Continuing to FIGS. 5A-5B, the vibration isolator 20 provides a pathway for the airflow 41 to move from the actuator handle 21 to the percussion mechanism 14. The percussion mechanism 14 creates cyclical percussion motion from the airflow 41. The vibration isolator 20 also absorbs vibration or feedback from the percussion mechanism 14, which is described further herein. Referring to FIG. 2, the vibration isolator 20 is depicted in greater detail. It is contemplated that the vibration isolator 20 may be added to an existing tamper or provided with a new tamper 10. It is further contemplated that the vibration isolator 20 may be used in other applications and with other equipment to reduce the vibrations or feedback felt by the operator. Through experimentation and research, the inventors recognized that it is also desirable to use a vibration isolator that incorporates multiple springs or other isolator devices to dampen or limit the vibration or feedback from the percussion mechanism 14 felt by the operator. Multiple springs also may be desirable when replacing, inspecting, and/or removing components of the vibration isolator 20.

Turning now to FIG. 2, the vibration isolator 20 is connected to the actuator handle 21. The vibration isolator 20 includes a hollow inner shaft 42, an outer sleeve 50, a first spring 56, a second spring 62, an upper cap 68, a lower cap 70, an upper bushing 72, and a lower bushing 74. A person of ordinary skill in the art will recognize that any component of the vibration isolator 20 may be integral with other components. Also, a person of ordinary skill in the art may recognize that any number of springs may be used.

The hollow inner shaft 42 allows the airflow 41 to move to the percussion mechanism 14. The hollow inner shaft 42 includes a first shaft end 44, an intermediate portion 46, and a second shaft end 48. In one example, the hollow inner shaft 42 has a circular cross-section. The outer sleeve 50, which includes a first sleeve end or upper end 52 and a second sleeve end or lower end 54, is slidingly positioned or received on the intermediate portion 46 of the hollow inner shaft 42. In one example, the outer sleeve 50 is hollow and has a circular cross section. The first spring 56, which includes a first end 58 and a second end 60, is also slidingly received on the first shaft end 44 of the hollow inner shaft 42. Similarly the second spring 62, which includes a first end 64 and a second end 66, is slidingly received on the second shaft end 48. The springs 56, 62 may be any type of spring or device known to those of ordinary skill in the art that dampen or limit vibrations felt by the operator including compression springs, extension springs, torsion springs, constant force springs, shocks, and the like.

In some examples, an upper bellows 76 and/or a lower bellows 78 are slidingly received around the first spring 56 and second spring 62, respectively, to protect the springs 56, 62 from external contaminates and inadvertent contact by the operator. The bellows 76, 78 may elastically deform to maintain the separation between the exterior of the environment and the components of the vibration isolator 20. The bellows 76, 78 may be constructed of any suitable material including rubber, plastic, fabric, metal, and the like.

In one example, the upper cap 68 is connected to the upper first shaft end 44 of the hollow inner shaft 42 and the first end 58 of the first spring 56. Similarly, the lower cap 70 is connected to the lower second shaft end 48 of the hollow inner shaft 42 and the second end 66 of the second spring 62. The upper cap 68, the hollow inner shaft 42, and the lower cap 70 constitute a piston which reciprocates in the vertical direction V within the outer sleeve 50. In some instances, the second end 60 of the first spring 56 is connected to the upper end 52 of the outer sleeve 50 and the first end 64 of the second spring 62 is connected to the lower end 54 of the outer sleeve 50. In another example, the upper bushing 72 may be connected to the upper end 52 of the outer sleeve 50 and the second end 60 of the first spring 56. The upper bushing 72 may also be connected to the valve body 22. The lower bushing 74 may be connected to the lower end 54 of the outer sleeve 50 and the first end 64 of the second spring 62. The upper bushing 72 and lower bushing 74 may be made of any suitable material including metal, steel, brass, bronze, metal alloy, plastic, and the like. One of ordinary skill in the art will recognize that the metal components may be made of different metals and/or alloys to minimize friction and wear with other surfaces and metals. It should also be known to those of ordinary skill in the art that any of the components of the tamper 10 may be connected to each other be any number of connections or combinations of connections. Exemplary connections may include screws, bolts, zip-ties 80, collars, friction clamps, connector rings, adhesives, screw threads, and the like.

In one example, the percussion mechanism 14 (see FIGS. 4 and 7A-7B) is connected to the lower second shaft end 48 of the hollow inner shaft 42 and/or the lower cap 70. The cyclical percussion motion of the percussion mechanism 14 causes the hollow inner shaft 42 to reciprocate in a vertical direction V. Movement in the vertical direction V causes the second spring 62 to compress and the first spring 56 to stretch as the hollow inner shaft 42 and/or the lower cap 70 move downward. The forces acting on the second spring 62 and the first spring 56 are reversed when the cyclical percussion motion of the percussion mechanism 14 reverses direction. The cooperation of the first spring 56 and second spring 62 decreases the vibrations or feedback transferred to the outer sleeve 50, and therefore, limits, reduces, and/or dampens the cyclical percussion motion felt by the operator.

The first spring 56 and the second spring 62 may be any length and stiffness as required to dampen the vibration or feedback from the percussion mechanism 14. The stiffness of the springs 56, 62 may be determined by the range of expected operating pressures, the degree of isolation desired, and the percussion mechanism 14. The first spring 56 stiffness and/or length may be the same or different than the second spring 62. It is also contemplated that the springs 56, 62 can be easily changed and/or replaced.

Figure 4:
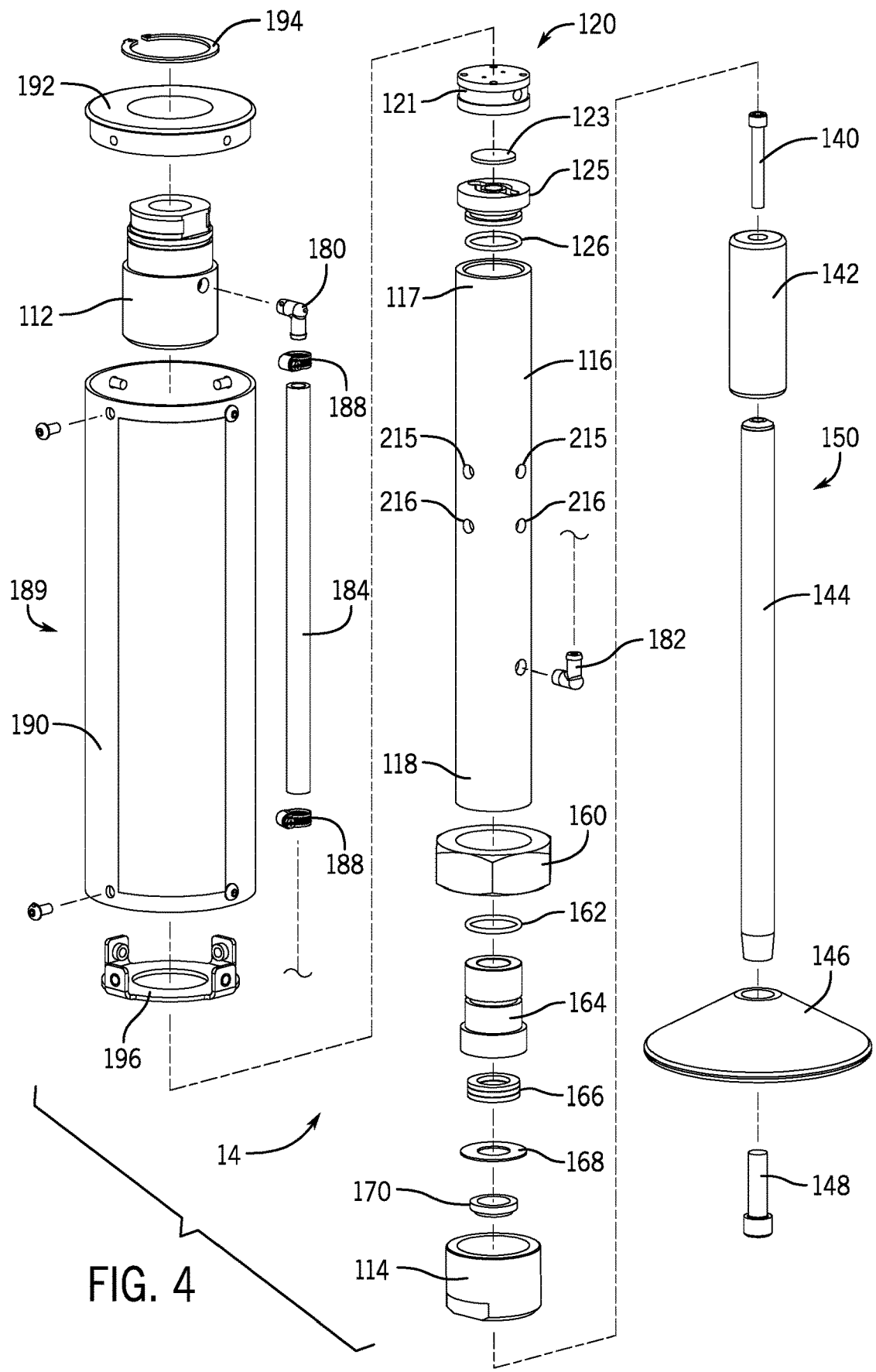
FIG. 4 is an exploded view of a percussion mechanism.

Referring now to FIG. 4, the percussion mechanism 14 is depicted in detail. The percussion mechanism 14 uses the airflow 41 to create a repetitive and/or cyclical percussion motion used to compact backfill. The motion is created when the airflow 41 moves through a series of valves, paths, channels, and/or other components, further described herein. The number and depth of the percussion motion may also vary based on the specific applications of the tamper 10. For instance, the percussion mechanism 14 may drive a shoe 146 with a five-inch stroke at 500 beats per minute. It should be known by those of ordinary skill in the art that any suitable stroke and speed may be used in conjunction with the aspects of this disclosure.

Prior art percussion mechanisms have been constructed from solid metal cylinders which have multiple hollow drilled paths and/or channels. Through experimentation and research, the inventors recognized that the solid metal cylinders are heavy and did not facilitate easy replacement of components. It is also desirable to minimize the number of the bores drilled into the cylinders and reduce the weight of the percussion mechanism.

In one example, the percussion mechanism 14 includes a percussion shaft 116 having a first end 117 and a second end 118 positioned or received between an upper percussion cap 112 and the lower percussion cap 114. A compaction assembly 150 is slidably positioned or received in the percussion shaft 116 and is further described herein. The percussion shaft 116 in the example depicted is a thin-walled elongated cylinder. One of ordinary skill in the art would recognize that the percussion shaft 116 may take any suitable shape and be made of any suitable material including metal, plastic, and the like.

In some instances, airflow 41 moves from an air source 12 through the vibration isolator 20 into the percussion mechanism 14. A valve assembly 120 is included at the upper end 117 and includes an upper valve 121, a valve disc 123, a lower valve 125, and a gasket 126. The upper valve 121 and/or the lower valve 125 include air inlets and paths which direct the airflow 41 through a plurality of flow paths to a plurality of air spaces, to be described further herein. In one example, a first flow path directs the airflow 41 to a first air space 211 and a second flow path directs the airflow 41 to a second air space 219. The valve disc 123 blocks and/or obstructs certain air inlets and paths to certain air flow paths when the pressure changes in the percussion shaft 116 during the cyclical percussion motion of the percussion mechanism 14 and/or the movement of the airflow 41.

The lower end 118 of the percussion shaft 116 slidingly receives a compaction assembly 150. The compaction assembly 150 includes a bolt 140, a ram head 142, and compaction rod 144. The lower end of the compaction rod 144 protrudes outwardly from the lower end 118. The compaction rod 144 is connected to a shoe 146 by a bolt 148. The shoe 146 contacts the ground 8 with a cyclical percussion motion when the percussion mechanism 14 is operating. The compaction assembly 150 moves between an up position and a down position based on the airflow 41 and changing volumes of the air spaces in the percussion shaft 116. A jam nut 160, a gasket 162, a percussion bushing 164, a gasket 166, a shroud cover 168, a shaft wiper 170, and the lower percussion cap 114 may also be connected to the lower end 118.

The percussion mechanism 14 also includes an upper elbow 180, a lower elbow 182, and an air conduit 184. The upper elbow 180 is connected to the upper percussion cap 112, and the lower elbow is connected to the percussion shaft 116. The air conduit 184 may be connected to the upper elbow 180 and lower elbow 182 by clamps 188. However, one having ordinary skill in the art will recognize that other connectors including rivets, screws, screw clamps, bolts, zip ties, and the like may be used to connect the air conduit 184 to the upper elbow 180 and lower elbow 182. Also, the upper elbow 180, lower elbow 182, and air conduit 184 may be made out of any suitable material including rubber, plastic, metal, a flexible material, a rigid material, and the like.

A shroud assembly 189 may surround the percussion mechanism 14 to protect the components from external forces and prevent injury to operators. The shroud assembly 189 includes a retaining ring 194, a top closure 192, a shroud 190, and a bottom closure 196. The components of the shroud assembly 189 may be replaceable. Also, the shroud assembly 189 may be removable allowing access to components of the percussion assembly 14, such as for inspection and/or maintenance purposes. The shroud assembly 189 may be constructed out of any suitable material including plastic, metal, ceramic, and the like. The shroud assembly 189 may also reduce noise coming from the percussion mechanism 14 and minimize the amount of foreign matter, such as dirt and water, entering the percussion mechanism 14 through upper relief holes 215 and lower relief holes 216, as further described herein.

Figure 7A:
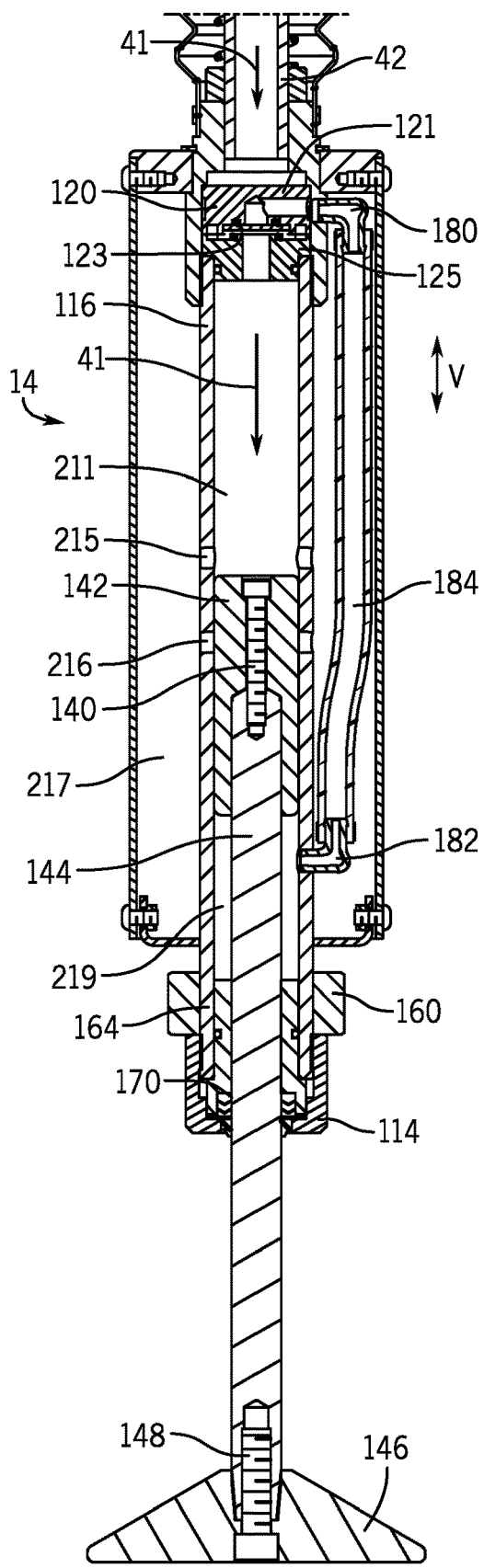
FIG. 7A is a cross sectional view along 7-7 when a ram head is in a down position.
Figure 7B:
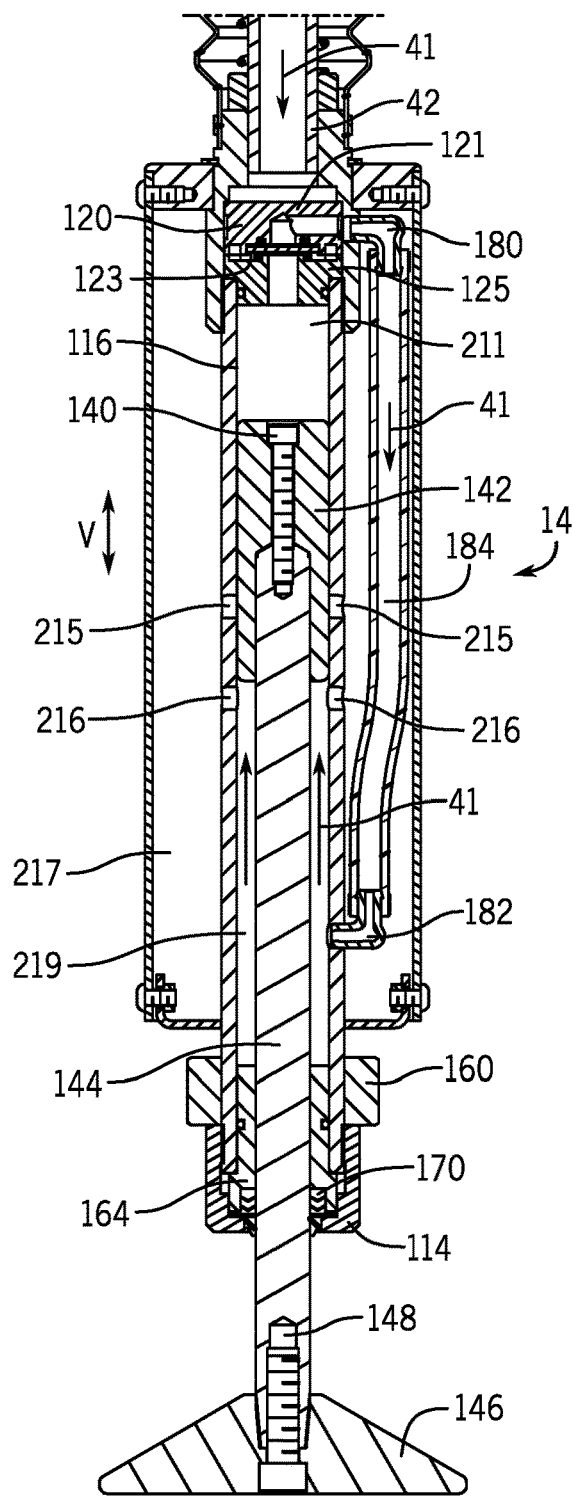
FIG. 7B is a cross sectional view along 7-7 when a ram head is in an up position.

Now turning to FIGS. 7A-7B, an exemplary operation of the percussion mechanism 14 is depicted. FIG. 7A depicts the ram head 142 in an up position. The airflow 41 moves through the upper percussion cap 112 and through the air inlets and paths of the valve assembly 120 that are not obstructed by the valve disc 123. The airflow 41 moves into the first air space 211 increasing the air pressure in the first air space 211. In response, the first air space 211 expands forcing the ram head 142 downward in the percussion shaft 116. The second air space 219 shrinks in volume during the expansion of the first air space 211. The first air space 211 continues to expand until the top of the ram head 142 passes an upper relief hole 215. The airflow 41 permitted to move from the first air space 211 through the upper relief hole 215 into the relief air space 217 causing the pressure in the first air space 211 to decrease. The release of pressure from the first air space 211 changes the pressure acting on the valve assembly 120 and/or valve disc 123. The change in pressure causes the valve disc 123 to obstruct and/or unblock different air inlets and paths of the valve assembly 120. This causes the airflow 41 to redirect and move into other air spaces. The ram head 142 moves upward in the percussion shaft 116 (as depicted in FIG. 7B) as the airflow 41 is directed through the upper elbow 180, air conduit 184, and lower elbow 182 and into a second air space 219. Air pressure in the second air space 219 increases causing the second air space 219 to expand and the ram head 142 to move upward. The first air space 211 shrinks in volume during the expansion of the second air space 219. The airflow 41 continues to move into the second air space 219 until the bottom of the ram head 142 moves past the lower relief holes 216. In this position, the pressure in the second air space 219 is permitted to move through the lower relief holes 216 into the relief air space 217. The release of pressure changes the pressure acting on the valve assembly 120 and/or the valve disc 123. The ram head 142 repeatedly and continuously moves between the up position and the down position until the airflow 41 moving into the percussion mechanism 14 stops. As mentioned above, the shoe 146 delivers a compacting force to the ground 8 each time the percussion mechanism 14 is repeated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A vibration isolator for use with a percussion mechanism configured to receive pressurized air, the vibration isolator comprising:
    a sleeve having a first sleeve end and a second sleeve end;
    a shaft that is reciprocated in the sleeve, the shaft having a first shaft end configured to receive the pressurized air and an opposite second shaft end configured to couple to the percussion mechanism and dispense the pressurized air to the percussion mechanism such that the pressurized air flows through the shaft, wherein the first sleeve end is closer than the second sleeve end to the first shaft end, and wherein the second sleeve end is closer than the first sleeve end to the second shaft end;
    a first spring surrounding the shaft such that the shaft extends inside the first spring, the first spring positioned between the first shaft end and the first sleeve end; and
    a second spring surrounding the shaft such that the shaft extends inside the second spring, the second spring positioned between the second shaft end and the second sleeve end and spaced apart from the first spring;
    wherein the first spring and the second spring are configured to reduce transmission of vibrations to the sleeve; and
    a first cap coupled to the first shaft end such that the first spring is bound between the first cap and the first sleeve end;
    a second cap coupled to the second shaft end such that the second spring is bound between the second cap and the second sleeve end;
    a first bellows extending between the first cap and the first sleeve end to thereby cover the first spring; and
    a second bellows extending between the second cap and the second sleeve end to thereby cover the second spring.

2. The vibration isolator according to claim 1, further comprising an actuator handle coupled to the sleeve, the actuator handle having a valve body and a trigger operably coupled to a spool, wherein operation of the trigger moves the spool relative to the valve body such that pressurized air flows through the valve body to the shaft.

3. The vibration isolator according to claim 2, further comprising an air hose through which the air flows from the valve body to the shaft.

4. A tamper comprising:
    a percussion mechanism configured to receive pressurized air and generate forces for compacting materials;
    a shaft having a first shaft end and an opposite second shaft end, wherein the first shaft end is configured to receive the pressurized air, and wherein the second shaft end couples to the percussion mechanism and is configured to dispense the pressurized air to the percussion mechanism;
    a sleeve surrounding the shaft and having a first sleeve end and a second sleeve end, wherein as the percussion mechanism generates the forces, the shaft is reciprocated in the sleeve, and wherein the first sleeve end is closer than the second sleeve end to the first shaft end, and wherein the second sleeve end is closer than the first sleeve end to the second shaft end;
    a first spring surrounding the shaft such that the shaft extends inside the first spring, the first spring positioned between the first shaft end and the first sleeve end;
    a second spring surrounding the shaft such that the shaft extends inside the second spring, the second spring positioned between the second shaft end and the second sleeve end;
    wherein as the shaft is reciprocated in the sleeve, the first spring and the second spring are configured to reduce transmission of vibrations to the sleeve;
    a first cap coupled to the first shaft end such that the first spring is bound between the first cap and the first sleeve end;
    a second cap coupled to the second shaft end such that the second spring is bound between the second cap and the second sleeve end;
    a first bellows extending between the first cap and the first sleeve end to thereby cover the first spring; and
    a second bellows extending between the second cap and the second sleeve end to thereby cover the second spring.

5. The tamper according to claim 4, wherein the first spring and the second spring hold the sleeve between the first shaft end and the second shaft end.

6. The tamper according to claim 4 further comprising:
    a first bushing coupled to the first sleeve end and the first spring such that the first spring is bound between the first cap and the first bushing; and
    a second bushing coupled to the second sleeve end and the second spring such that the second spring is bound between the second cap and the second bushing.

7. The tamper according to claim 4, wherein as the shaft is reciprocated in the sleeve, the first spring and the second spring alternately compress.

8. The tamper according to claim 4, further comprising:
an actuator handle coupled to the sleeve, the actuator handle having a valve body and a trigger operably coupled to a spool, wherein operation of the trigger moves the spool relative to the valve body such that the pressurized air flows through the valve body to the shaft.

9. The tamper according to claim 8, further comprising a hose through which the pressurized air flows from the valve body to the shaft.

10. A vibration isolator for use with a percussion mechanism configured to receive pressurized air, the vibration isolator comprising:
a shaft having a first shaft end configured to receive the pressurized air and an opposite second shaft end configured to couple to the percussion mechanism and dispense the pressurized air to the percussion mechanism;
a sleeve through which the shaft extends, the sleeve having a first sleeve end oriented toward the first shaft end and an opposite second sleeve end oriented toward the second shaft end;
a first spring surrounding the shaft and extending along the shaft in a direction away from the first sleeve end;
a second spring surrounding the shaft and extending along the shaft a direction away from the second sleeve end; and
wherein the first spring and the second spring are configured to reduce transmission of vibrations to the sleeve;
wherein the shaft extends along a center axis, and wherein the first spring is axially offset from the sleeve such that the first spring is exterior to the sleeve and the second spring is axially offset from the sleeve such that the second spring is exterior to the sleeve.

11. The vibration isolator according to claim 1, wherein as the shaft is reciprocated in the sleeve, the first spring and the second spring alternately compress.

12. The vibration isolator according to claim 1, wherein the first spring and the second spring hold the sleeve between the first shaft end and the second shaft end.

13. The vibration isolator according to claim 1, further comprising:
a first bushing coupled to the first sleeve end and the first spring such that the first spring is bound between the first cap and the first bushing; and
a second bushing coupled to the second sleeve end and the second spring such that the second spring is bound between the second cap and the second bushing.

* * * * *